(12) United States Patent
Wilson et al.

(10) Patent No.: US 10,112,726 B2
(45) Date of Patent: Oct. 30, 2018

(54) OPTICAL HEALTH MONITORING FOR AIRCRAFT OVERHEAT AND FIRE DETECTION SYSTEMS

(71) Applicant: Kidde Technologies, Inc., Wilson, NC (US)

(72) Inventors: Christopher Wilson, Wake Forest, NC (US); David William Frasure, Wilson, NC (US); Mark Thomas Kern, Goleta, CA (US); Mark Sherwood Miller, Lakeville, MN (US); Scott Kenneth Newlin, Willow Spring, NC (US); Chris George Georgoulias, Raleigh, NC (US); Stefan Coreth, Roanoke Rapids, NC (US); Ken Bell, Raleigh, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 15/600,077

(22) Filed: May 19, 2017

(65) Prior Publication Data

US 2017/0334574 A1    Nov. 23, 2017

Related U.S. Application Data

(60) Provisional application No. 62/338,775, filed on May 19, 2016.

(51) Int. Cl.
*G01M 17/00* (2006.01)
*B64D 45/00* (2006.01)
(Continued)

(52) U.S. Cl.
CPC .......... *B64D 45/00* (2013.01); *G01K 11/3206* (2013.01); *G02B 6/34* (2013.01);
(Continued)

(58) Field of Classification Search
CPC ....... B64D 45/00; G01K 11/3206; G02B 6/34
See application file for complete search history.

(56) References Cited

U.S. PATENT DOCUMENTS 7,418,171 B2 * 8/2008 Grattan ................... G01L 1/242
  374/E11.016
2002/0125414 A1 * 9/2002 Dammann ............. B64D 45/00
  250/227.14

(Continued)

FOREIGN PATENT DOCUMENTS

EP    2434410 A2    3/2012
EP    2897310 A1    7/2015
(Continued)

OTHER PUBLICATIONS

Extended European Search Report for EP Application No. 17171884.4, dated Jul. 21, 2017, 9 pages.

*Primary Examiner* — Adam M Alharbi
(74) *Attorney, Agent, or Firm* — Kinney & Lange, P.A.

(57) ABSTRACT

Overheat and fire detection for aircraft systems includes an optical controller and a fiber optic loop extending from the optical controller. The fiber optic loop extends through one or more zones of the aircraft. An optical signal is transmitted through the fiber optic loop from the optical controller and is also received back at the optical controller. The optical controller analyzes the optical signal to determine the temperature, strain, or both experienced within the zones.

16 Claims, 6 Drawing Sheets

(51) Int. Cl.
  *G08C 23/04*   (2006.01)
  *H04J 14/08*   (2006.01)
  *H04J 14/02*   (2006.01)
  *H04B 10/071*   (2013.01)
  *G07C 5/08*   (2006.01)
  *G01K 11/32*   (2006.01)
  *G02B 6/42*   (2006.01)
  *G02B 6/34*   (2006.01)

(52) U.S. Cl.
  CPC ............ *G02B 6/4266* (2013.01); *G07C 5/08* (2013.01); *G08C 23/04* (2013.01); *H04B 10/071* (2013.01); *H04J 14/0227* (2013.01); *H04J 14/08* (2013.01); *B64D 2045/009* (2013.01); *B64D 2045/0085* (2013.01); *G08C 2200/00* (2013.01)

(56) References Cited

U.S. PATENT DOCUMENTS

2005/0089081 A1   4/2005   Dammann
2014/0266742 A1   9/2014   Rennie

FOREIGN PATENT DOCUMENTS

WO   WO 2013055466 A1   4/2013
WO   WO 2015199590 A1   12/2015

* cited by examiner

OPTICAL HEALTH MONITORING FOR AIRCRAFT OVERHEAT AND FIRE DETECTION SYSTEMS

CROSS-REFERENCE INFORMATION

This application claims the benefit of U.S. Provisional Application No. 62/338,775 filed May 19, 2016 for "OPTICAL HEALTH MONITORING FOR AIRCRAFT OVERHEAT AND FIRE DETECTION SYSTEMS" by Christopher Wilson, David William Frasure, Mark Thomas Kern, Mark Sherwood Miller, Scott Kenneth Newlin, Chris George Georgoulias, Stefan Coreth and Ken Bell.

BACKGROUND

This disclosure relates generally to aircraft system health monitoring for overheat and fire detection systems. More particularly, this disclosure relates to aircraft system health monitoring using optical signals.

Overheat detection systems monitor various zones within an aircraft, such as bleed ducts where high temperature, high pressure air is bled from the compressor stage of an engine, or in the wheel well of an aircraft to sense overheated brakes and/or "hot" tires which indicate that the tire has a low air pressure or that the brakes are hot. Overheat detection can be used for any equipment on the aircraft that requires monitoring for overheat conditions, such as electric motors, compressors, etc. Bleed air is utilized for a variety of functions on the aircraft, such as engine and airframe anti-icing, internal cooling of the engine, cabin pressurization and environmental controls, pressurization of hydraulic reservoirs and seals, and others. The bleed air typically has a temperature between 100° F. and 1,100° F. depending on the distance that the bleed air has traveled from the engine. The high temperature and pressure of the bleed air means that the bleed air may damage the aircraft if a leak or rupture occurs in the bleed duct. As such, overheat detection systems have sensors that run the length of the bleed ducts, or along structures in the vicinity of the bleed ducts, to monitor for temperature changes that would indicate leaks or ruptures in the duct.

Prior art overheat detection systems typically utilize eutectic salt technology to sense an overheat event. The eutectic salt surrounds a central conductor and the eutectic salt is surrounded by an outer sheath. A monitoring signal is sent down the central conductor, and under normal operating conditions the eutectic salt operates as an insulator such that no conduction occurs between the central conductor and the outer sheath. When an overheat event occurs, however, a portion of the eutectic salt melts and a low-impedance path is formed between the central conductor and the outer sheath. The low-impedance path is sensed by an electronic controller, which generates an overheat alarm signal. When the overheat event has subsided, the eutectic salt re-solidifies and once again insulates the central conductor. Through the use of various salts to create a eutectic mixture, a specific melting point for the salt can be achieved; thereby allowing different eutectic salts to be used in different areas of the aircraft to provide overheat monitoring across a variety of temperatures. While the eutectic salt technology allows for overheat events to be detected, the eutectic salt technology merely provides a binary indication of whether an overheat event has or has not occurred.

SUMMARY

In one example, a system for an aircraft that includes a plurality of zones includes a first zone fiber optic cable routed through a first set of the plurality of zones; a first local controller configured to provide a first optical signal to the first zone fiber optic cable and obtain a first response signal from the first zone fiber optic cable; wherein the first local controller is further configured to determine at least one temperature for each of first set of the plurality of zones based on the first response signal and provide an indication for first detected zones of the first set of the plurality of zones in which the at least one temperature is greater than a threshold value.

In another example, a method of detecting thermal conditions for an aircraft includes emitting, by a first local controller, a first optical signal to a first zone fiber optic cable, wherein the first zone fiber optic cable is routed through each of a first plurality of zones of the aircraft; receiving, by the first local controller, a response signal from the first zone fiber optic cable based upon the first optical signal; determining, using the first local controller, at least one temperature each of the first plurality of zones based on the response signal; and indicating a first condition for a respective one of the first plurality of zones if the at least one temperature for the respective one of the first plurality of zones is greater than a threshold.

DETAILED DESCRIPTION

Figure 1:
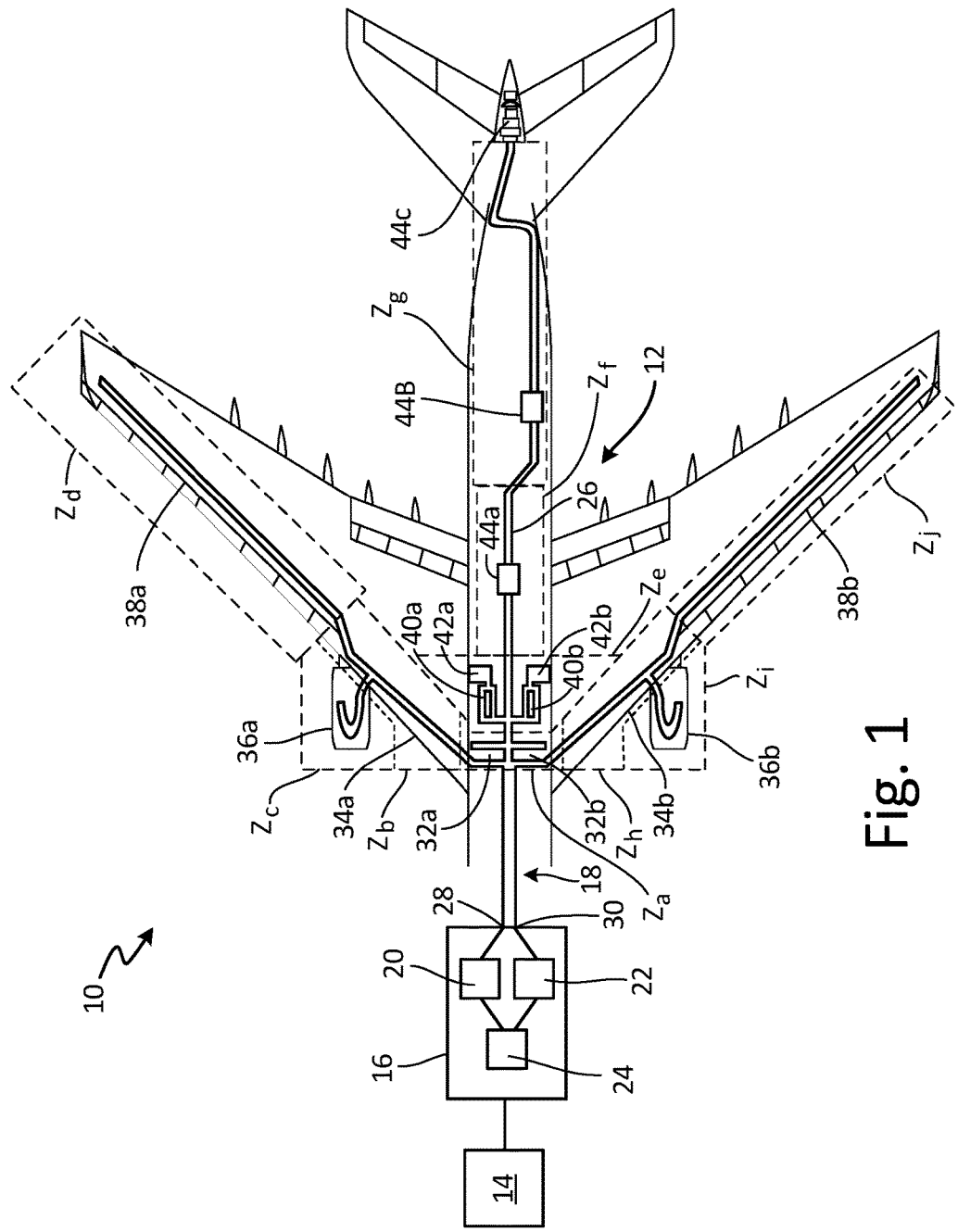
FIG. 1 is a schematic view of an overheat detection system architecture for monitoring all zones.

FIG. 1 is a schematic view of overheat detection system 10 for aircraft 12. Aircraft 12 includes zones Za-Zj and avionics controller 14. Overheat detection system 10 includes optical controller 16 and fiber optic loop 18. Optical controller 16 includes optical transmitter 20, optical receiver 22, and computer-readable memory 24. Fiber optic loop 18 includes first fiber optic cable 26. First fiber optic cable 26 includes first end 28 and second end 30. Fiber optic loop 18 is connected to optical controller 16 and extends between optical transmitter 20 and optical receiver 22. Both first end 28 and second end 30 of first fiber optic cable 26 can be connected to optical transmitter 20. Similarly, both first end 28 and second end 30 of first fiber optic cable 26 can be connected to optical receiver 22. It is understood, however, that in some examples only one of first end 28 or second end 30 is connected to optical transmitter 20 and/or optical receiver 22. First fiber optic loop 18 extends through all zones Za-Zj of aircraft 12. Optical controller 16 is connected to avionics controller 14 to communicate with other systems within aircraft 12.

Optical controller 16 may be configured to control optical transmitter 20 to control the transmission of an optical signal through fiber optic loop 18. Optical controller 16 may also be configured to receive an optical signal from optical receiver 22 and to analyze the optical signal received at optical receiver 22. Optical controller 16 may be a microprocessor, microcontroller, application-specific integrated circuit (ASIC), digital signal processor (DSP), field programmable gate-array (FPGA) or any other circuit capable of controlling optical transmitter 20 and receiving signals from optical receiver 22. Optical controller 16 may include one or more computer-readable memory encoded with instructions that, when executed by the controller 16, cause optical controller 16 and/or other elements of overheat detection system 10 to operate in accordance with techniques described herein. Optical controller 16 may further communicate with avionics controller 14 to communicate temperature data to avionics controller 14 using a wired or wireless connection. It is understood that all communications for overheat detection system 10 can be made using wired, wireless, or optical communications or some combination of these methods.

Computer-readable memory 24 of optical controller 16 can be configured to store information within optical controller 16 during and after operation. Computer-readable memory 24, in some examples, can be described as a computer-readable storage medium. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, computer-readable memory 24 can include temporary memory, meaning that a primary purpose of the computer-readable memory is not long-term storage. Computer-readable memory 24, in some examples, can be described as a volatile memory, meaning that the computer-readable memory 24 does not maintain stored contents when electrical power to optical controller 16 is removed. Examples of volatile memories can include random access memories (RAM), dynamic random access memories (DRAM), static random access memories (SRAM), and other forms of volatile memories. In some examples, computer-readable memory 24 can be used to store program instructions for execution by one or more processors of optical controller 16. For instance, computer-readable memory 24 can be used by software or applications executed by optical controller 16 to temporarily store information during program execution.

Optical controller 16 is connected to optical transmitter 20 to control the transmission of an optical signal from optical transmitter 20 to fiber optic cable 18. Optical controller 16 is also connected to optical receiver 22 to analyze the signals received by optical receiver 22. Optical controller 16 receives information regarding the optical signal from optical receiver 22. Variations in the optical signals analyzed by optical controller 16 allows optical controller 16 to determine the temperature within zones Za-Zj and to determine the location that a temperature variation occurs in within zones Za-Zj. The variations in the optical signals also allow optical controller 16 to determine the strain experienced at various locations along fiber optic cable 26.

Optical transmitter 20 is controlled by optical controller 16 and can be connected to first end 28 of fiber optic cable 26, to second end 30 of fiber optic cable 26, or to both. Optical transmitter 20 is configured to provide an optical signal to first end 28 or second end 30 of first fiber optic cable 26. Optical transmitter 20 may be any suitable optical source for providing an optical signal to first fiber optic cable 26. For example, optical transmitter may be a light-emitting diode or a laser. It is further understood that optical transmitter 20 may be configured to provide the optical signal in any suitable manner, such as through a single pulse at a fixed wavelength; a tunable swept-wavelength; a broadband signal; and a tunable pulse. Furthermore, while optical controller 16 is described as including optical transmitter 20, it is understood that optical controller 16 may include one or more optical transmitters 20 to provide optical signals to first fiber optic cable 26.

Optical receiver 22 is configured to receive the optical signal from either first end 28 or second end 30 of first fiber optic cable 26. Where optical transmitter 20 provides the optical signal through first end 28, a first portion of the optical signal travels through first fiber optic cable 26 and is received by optical receiver 22 at second end 30. A second portion of the optical signal can be reflected back to first end 28 and received by optical receiver 22. Optical receiver 22 communicates information regarding the first portion of the optical signal, the second portion of the optical signal, or both to optical controller 16. Optical receiver 22 may be any suitable receiver for receiving an optical signal. For example, optical receiver 22 may be a photodiode, a photodiode array, a phototransistor, or any other suitable optical receiving device.

Fiber optic loop 18 may include a single, continuous fiber optic loop extending through all zones Za-Zj in aircraft 12. Zones Za-Zj may include any location on aircraft 12 where overheat detection is desired. For example, zones Za-Zj may include bleed air ducts, cross-over bleed air ducts, wheel wells, wing boxes, Air Conditioning (A/C) packs, anti-icing systems, nitrogen generation systems, or any other area where temperature sensing is desirable. Zones Za-Zj may be divided and assigned in any desired manner. In the illustrated example, zone Za includes right side cross-over bleed air duct 32a and left side cross-over bleed air duct 32b; zone Zb includes right wing box 34a; zone Zc includes right pylon 36a; zone Zd includes right wing ice protection system 38a; zone Ze includes rights A/C pack 40a, left A/C pack 40b, right wheel well 42a, and left wheel well 42b; zone Zf includes first APU 44a; zone Zg includes second APU 44b and third APU 44c, zone Zh includes left wing box 34b; zone Zi includes left pylon 36b; and zone Zj includes left wing ice protection system 38b. While aircraft 12 is described as including ten zones, it is understood that aircraft 12 may be divided into as many or as few zones as desired.

Aircraft 12 may be divided into zones in any desired manner; for example, aircraft 12 may be divided into zones based on the overheat temperature for the components located in that zone or based on system type. Each zone Za-Zj of aircraft may have a different alarm set point, such that where the temperature in zone Za is the same as the temperature in zone Zb an overheat alarm may be triggered for zone Zb but not for zone Za.

Fiber optic loop 18 is a continuous fiber optic loop that passes through all zones Za-Zj of aircraft 12 to provide temperature and/or strain sensing across all zones Za-Zj. Fiber optic loop 18 is connected to optical controller 16, and optical controller 16 is configured to determine the occurrence of an overheat event, the zone in which the overheat event has occurred in, and whether the overheat event is at or above the alarm set point for that zone. Optical controller 16 thus knows the length and alarm set point of fiber optic loop 18 in each zone Za-Zj and the order in which fiber optic loop 18 passes through each zone Za-Zj. While overheat detection system 10 is described as including fiber optic loop 18, overheat detection system 10 may include any desired number of fiber optic loops passing through each zone 18. For example, overheat detection system 10 may include a second fiber optic loop connected to optical controller 16 such that an overheat condition is triggered only when both first fiber optic loop 18 and the second fiber optic loop go into an alarm condition within a specified time period. Moreover, while fiber optic loop 18 is described as including first fiber optic cable 26 in a loop configuration, it is understood that first fiber optic cable 26 can be disposed in a single-ended configuration such that only one of first end 28 and second end 30 is connected to optical controller 16. For example, in the single-ended configuration where first end 28 is connected to optical controller 16, optical controller 16 can provide an optical signal to first end 28 of first fiber optic cable 26 and can interpret the signal that is reflected back to optical controller 16 through first end 28.

Optical controller 16 analyzes the information provided by the optical signal using the techniques discussed herein to determine the temperature in each zone Za-Zj, the strain in each zone Za-Zj, or both. Where optical controller 16 determines that the temperature in a zone is above the alarm set point for that zone, optical controller 16 generates an alarm signal that an overheat event has occurred. In addition to sensing the existence of an overheat event, monitoring the temperature in each zone Za-Zj allows overheat detection system 10 to provide fire detection for zones Za-Zj. For example, a dramatic, sudden increase in temperature can indicate the existence of a fire or overheat event, and because optical controller 16 monitors the actual temperature instead of merely whether or not an overheat event has occurred, optical controller 16 can sense the dramatic, sudden increase in temperature and provide a fire or overheat detection warning to the cockpit, to a fire suppression system, or to any other location.

Overheat detection system 10 can sense a temperature or strain at any location or at multiple locations along first fiber optic cable 26. Because the temperature can be sensed at any location or multiple locations along first fiber optic cable 26, a temperature profile may be developed for the entire length of first fiber optic cable 26, and as such, a temperature profile may be developed for each zone Za-Zj. Overheat detection system 10 can further provide locational information regarding the exact location within each zone Za-Zj that an overheat occurs at. The temperature profile for each zone Za-Zj can then be compared to a maximum allowable temperature profile, which can include a single temperature for an entire zone Za-Zj or multiple temperatures at varying locations in each zone Za-Zj. As such, it is understood that optical controller 16 can determine any desired temperature data for any zone Za-Zj, and the temperature data can include a single temperature at a single location within a zone, temperatures at multiple locations throughout a zone, a temperature profile for a zone, or determining and developing any other desired temperature data for the zone.

Optical controller 16 can also generate trend data to allow for health monitoring of aircraft 12. The trend data may include data regarding temperature trends, strain trends, or both. The trend data can be stored in memory 24 of optical controller 16 or in any other suitable storage medium at any other suitable location, such as the memory of avionics controller 14. It is understood that the data can be monitored in real time. For example, optical controller 16 may communicate with a dedicated health monitoring system to monitor the temperature data in real time. The stored trend data provides statistical and historical data for the temperature, strain, or both experienced in all zones Za-Zj. The temperature trend data may be stored and monitored by maintenance personnel. As such, the temperature trend data allows maintenance personnel to determine the exact location of progressive temperature increases over time. It is further understood that optical controller 16 can generate the exact location of a one-time temperature variation, strain variation, or both. Generating the locations of progressive temperature increases allows for preventative, targeted maintenance before a failure occurs. For example, the temperature trend in right wheel well 42a may be monitored to generate trend data. The trend data may show that a tire within right wheel well 42a exceeds the normal operating temperatures without reaching the alarm set point. In such a case an overheat event does not occur; however, the temperature trend data informs maintenance personal that the tire may be close to failing or that the tire may be low on air pressure and that a maintenance action is required. Similar to temperature monitoring, the strain trend data may be stored and areas of increased strain may be located. For example, the pressure of the bleed air passing through right side cross-over bleed duct 32a may impart a strain on the wall of right side cross-over bleed duct 32a. The level of the strain and the location of the strain may be detected by optical controller 16 analyzing the information received from the optical signals. The strain information may then be communicated to ground personnel and used to investigate the location of the increased strain to determine any maintenance action that should be taken.

Optical controller 16 is connected to avionics controller 14 to communicate information to avionics controller 14. While optical controller 16 is described as communicating with avionics controller 14, optical controller 16 may communicate with aircraft 12 and with maintenance personnel in any suitable manner. Optical controller 16 may also communicate directly with a cockpit of aircraft 12 to provide overheat or fire detection warning, or to indicate that maintenance is necessary. Optical controller 16 may further communicate temperature data to other non-overheat detection system computers, which may communicate an overheat status to the cockpit. Aircraft 12 may also include a central overheat detection system computer that communicates with various overheat detection systems on aircraft, and the central overheat detection system computer may communicate any overheat status from any overheat detection system to the cockpit. It is understood that all communications for overheat detection system 10 can be made using wired, wireless, or optical communications or some combination of these methods.

Figure 2A:
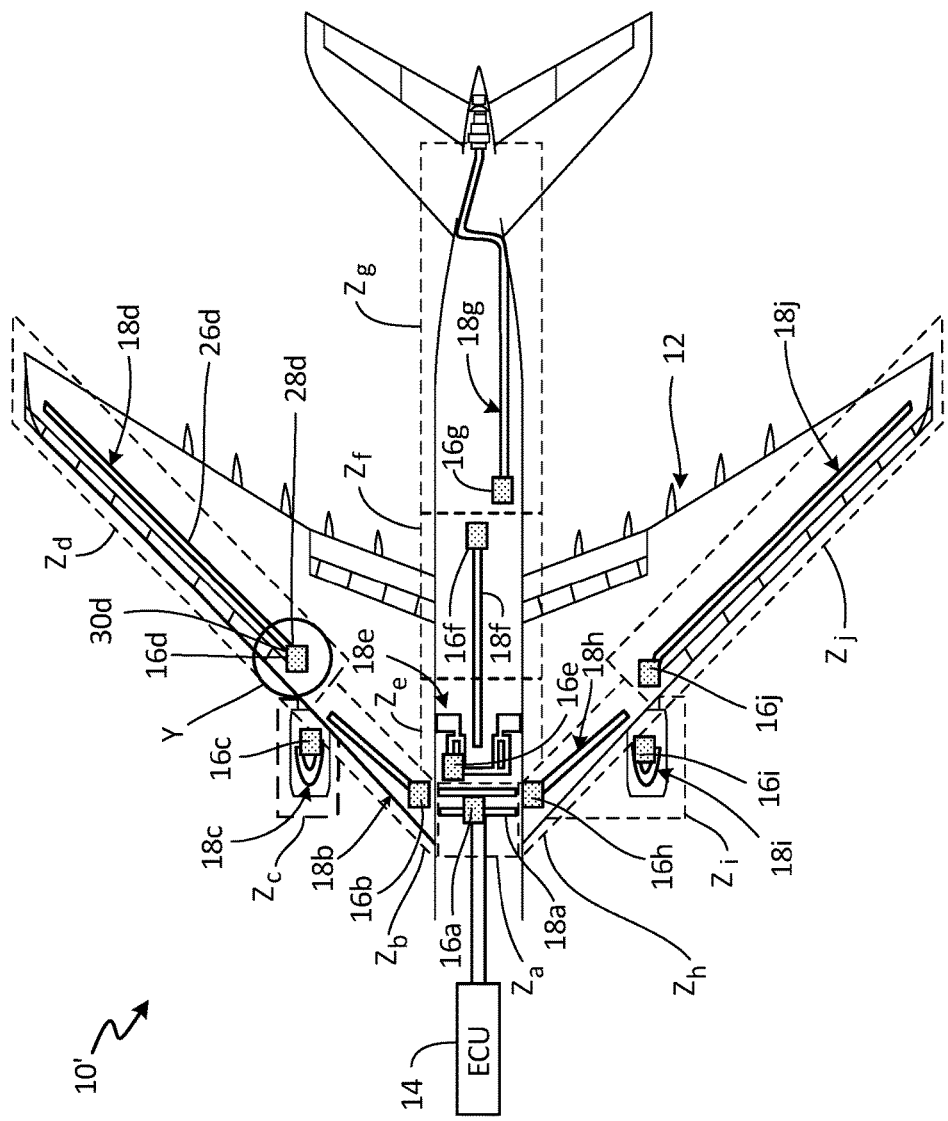
FIG. 2A is a schematic view of an overheat detection system architecture for monitoring individual zones.

FIG. 2A is a schematic diagram of overheat detection system 10' for aircraft 12. Aircraft 12 includes zones Za-Zj and avionics controller 14. Overheat detection system 10' includes optical controllers 16a-16j and fiber optic loops 18a-18j. Zones Za-Zj extend through any portion of aircraft 12 where temperature monitoring, strain monitoring, or both are desirable.

In overheat detection system 10', each optical controller 16a-16j and fiber optic loop 18a-18j is dedicated to a single zone Za-Zj. As such, each optical controller 16a-16j and fiber optic loop 18a-18j monitors and gathers temperature and strain information from a single zone Za-Zj. Each optical controller 16a-16j includes an optical transmitter (discussed in detail below in FIGS. 2B-2D) and an optical receiver (discussed in detail below in FIGS. 2B-2D).

All zones Za-Zj can have a unique alarm set point, and each zone Za-Zj can include any location or combination of locations on aircraft 12 where temperature and strain monitoring and detection are desired. For example, zones Za-Zj may include bleed air ducts, cross-over bleed air ducts, wheel wells, wing boxes, A/C packs, anti-icing systems, nitrogen generation systems, or any other area where temperature sensing is desirable. While aircraft 12 is described as including ten zones, it is understood that aircraft 12 may be divided into as many or as few zones as desired.

Fiber optic loop 18d is illustrated as including first fiber optic cable 26d, and first fiber optic cable 26d includes first end 28d and second end 30d. It is understood, that while fiber optic loop 18d is illustrated as including first fiber optic cable 26d, each fiber optic loop 18a-18j can include one or more fiber optic cables. In addition, each fiber optic cable can include a first end and a second end connected to controllers 16a-16j. Overheat and strain detection across each of zones Za-Zj is substantially similar, and for ease of discussion, zone Zd will be discussed in further detail. Optical controller 16d controls the transmission of an optical signal from the optical transmitter through fiber optic loop 18d. The optical signal may be provided to first fiber optic cable 26d through first end 28d, second end 30d or both. Where the optical signal is provided through first end 28d, a first, majority portion of the optical signal passes through first fiber optic cable 26d, to second end 30d, and is received by the optical receiver at second end 30d. A second, minority portion of the fiber optic signal is backscattered within first fiber optic cable 26d and received at first end 28d by the optical receiver. While optical controller 16d is described as including a single optical receiver, it is understood that optical controller 16d may include multiple optical receivers to receive the optical signal from different fiber optic loops, different fiber optic cables, and/or different ends of the fiber optic cables. Optical controller 16d receives optical signal data regarding both the first, majority portion and the second, minority portion of the optical signal. Optical controller 16d analyzes the optical signal data to determine the temperature, strain, or both within zone Zd. Moreover, while optical controller 16d is described as receiving both the first portion and the second portion of the optical signal, it is understood that in some examples first end 28d is connected to optical controller 16d while second end 30d remains disconnected, such that fiber optic cable 26d is in a single-ended configuration. Where fiber optic cable 26d is in a single-ended configuration, optical controller 16d can receive relevant information from the backscattered portion of the optical signal.

Figure 2B:
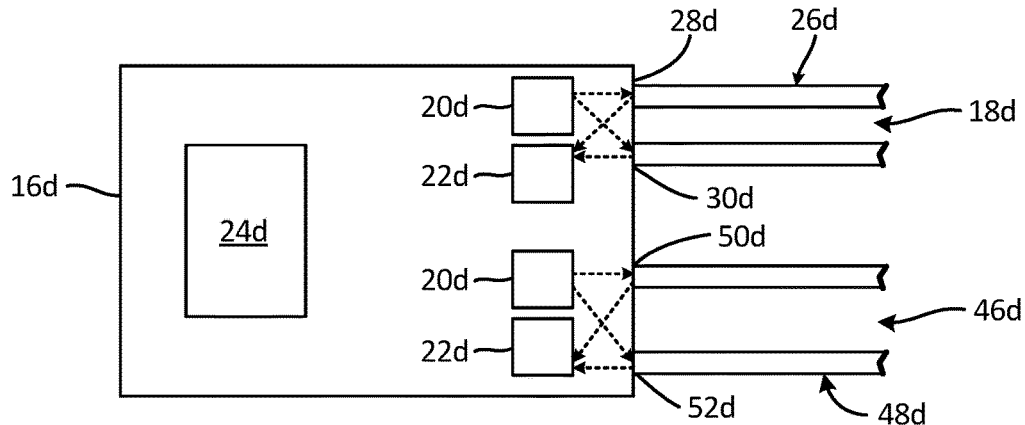
FIG. 2B is an enlarged view of a first embodiment of detail Y in FIG. 2A including a dual loop configuration.

FIG. 2B is an enlarged view of detail Y in FIG. 2A, showing a dual loop configuration. FIG. 2B includes optical controller 16d, first fiber optic loop 18d, second fiber optic loop 46d, optical transmitters 20d, optical receivers 22d, and computer-readable memory 24d. First fiber optic loop 18d includes first fiber optic cable 26d, and first fiber optic cable 26d includes first end 28d and second end 30d. Second fiber optic loop 46d includes second fiber optic cable 48d, and second fiber optic cable 48d includes first end 50d and second end 52d.

First fiber optic loop 18d extends from optical controller 16d through zone Zd (best seen in FIG. 2A). First fiber optic loop 18d includes first fiber optic cable 26d, and first fiber optic cable 26d is configured to receive a first optical signal from optical transmitter 20d. Optical receiver 22d is configured to receive the first optical signal from first fiber optic cable 26d. Optical receiver 22d provides information regarding the resultant optical signal to optical controller 16d. Optical controller 16d analyzes the information to generate temperature information, strain information, or both.

Similar to first fiber optic loop 18d, second fiber optic loop 46d extends through zone Zd. Second fiber optic loop 46d runs parallel to first fiber optic loop 18d through zone Zd. Second fiber optic cable receives a second optical signal from optical transmitter 20d. Optical receiver 22d receives the second optical signal from second fiber optic cable 48d, and optical receiver 22d provides information regarding the received second optical signal to optical controller 16d. Optical controller 16d analyzes the information to generate temperature information, strain information, or both.

While first fiber optic loop 18d and second fiber optic loop 46d are illustrated as receiving an optical signal from discrete optical transmitters 20d, it is understood that a single optical transmitter may provide the same optical signal to both first fiber optic loop 18d and second fiber optic loop 46d.

First fiber optic loop 18d and second fiber optic loop 46d run parallel through zone Zd. First fiber optic loop 18d and second fiber optic loop 46d extend through zone Zd in a dual loop configuration. In the dual loop configuration, the optical signal provided to second fiber optic cable 48d is preferably identical to the optical signal provided to first fiber optic cable 26d. Providing the same optical signal to both first fiber optic cable 26d and second fiber optic cable 48d allows optical controller 16d to compare the resultant signal obtained from first fiber optic cable 26d to the resultant signal obtained from second fiber optic cable 48d, thereby providing a greater degree of confidence in both first fiber optic loop 18d and second fiber optic loop 46d. As such, the optical signals passing through first fiber optic loop 18d and second fiber optic loop 46d provide data regarding the same changes in temperature and strain at the same locations throughout first fiber optic loop 18d and second fiber optic loop 46d. Both first fiber optic cable 26d and second fiber optic cable 48d communicate the information regarding the resultant optical signals to optical controller 16d.

In a single loop configuration, a single fiber optic loop passes through each zone, and an overheat event is indicated when optical controller 16d detects an alarm state in the single fiber optic loop. In a dual loop configuration, a first fiber optic loop passes through a zone and a second fiber optic loop passes through the zone running parallel to the first fiber optic loop. An overheat event is detected when both the first fiber optic loop and the second fiber optic loop sense the same overheat event within a specified time duration. First fiber optic cable 26d and second fiber optic cable 48d have the same alarm set point in the same zone. An overheat event is detected when both first fiber optic cable 26d and second fiber optic cable 48d sense the overheat event within a specified time duration. As such, optical controller 16d triggers an overheat alarm only when both first fiber optic cable 26d and second fiber optic cable 48d sense the overheat event in zone Zd, within a predetermined time period. In this way, the dual loop configuration ensures that overheat events are detected with high reliability. While a dual loop configuration is described as extending through zone Zd, it is understood that a dual loop configuration may pass through any zone Za-Zj and be received by any optical controller 16a-16j.

Figure 2C:
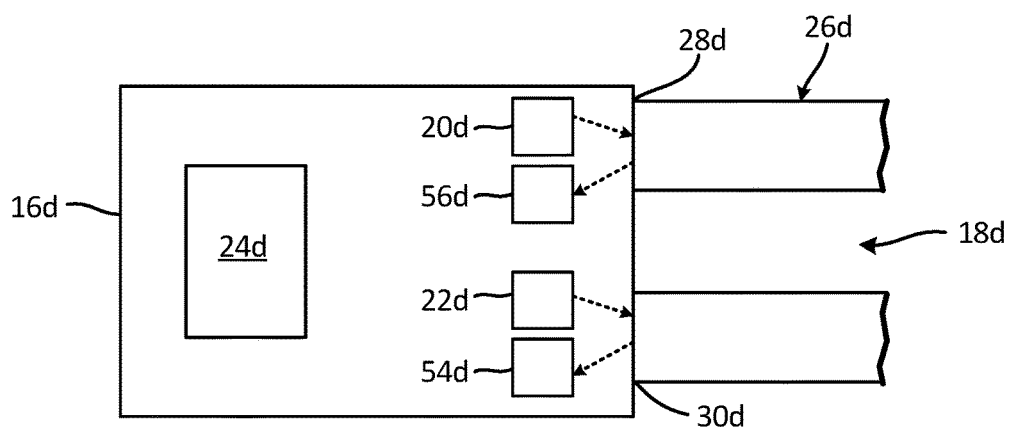
FIG. 2C is an enlarged view of a second embodiment of detail Y in FIG. 2A including a probe configuration.

FIG. 2C is an enlarged view of detail Y of FIG. 2A, showing optical controller 16d including a probe signal configuration. In a probe signal configuration, an optical signal is provided to a first end of a fiber optic cable and a probe signal is provided to a second end of the fiber optic cable. For example, the optical signal may be a pulsed signal and the probe signal may be a continuous wave. The optical signal interacts with the probe signal as the optical signal and the probe signal pass within the fiber optic cable. The interaction between the optical signal and the probe signal provides information regarding the temperature, the strain, or both along the length of the fiber optic cable. FIG. 2C includes optical controller 16*d*, fiber optic loop 18*d*, optical transmitter 20*d*, optical receiver 22*d*, computer-readable memory 24*d*, probe transmitter 54*d*, and probe receiver 56*d*. Fiber optic loop 18*d* includes first fiber optic cable 26*d*, and first fiber optic cable 26*d* includes first end 28*d* and second end 30*d*.

Fiber optic loop 18*d* extends through zone Zd (best seen in FIG. 2A). First end 28*d* of first fiber optic cable 26*d* is connected to optical controller 16*d* and configured to receive an optical signal from optical transmitter 20*d*. Second end 30*d* of first fiber optic cable 26*d* is connected to optical controller 16*d* and is configured to receive a probe signal from probe transmitter 54*d*. Optical controller 16*d* controls both optical transmitter 20*d* and probe transmitter 54*d*.

Optical transmitter 20*d* provides an optical signal to first end 28*d* of first fiber optic cable 26*d*. Simultaneously, probe transmitter 54*d* provides a probe signal to second end 30*d* of first fiber optic cable 26*d*. For example, one of the optical signal and the probe signal may be a pulsed signal and the other one of the optical signal and the probe signal may be a continuous wave. The optical signal and the probe signal interact as the optical signal passes the probe signal in first fiber optic cable 26*d*. A frequency difference between the optical signal and the probe signal is received by optical receiver 22*d*, probe receiver 56*d*, or both. Optical controller 16*d* monitors the interaction between the optical signal and the probe signal, as the interaction between the optical signal and the probe signal changes as the temperature and strain change within zone Zd. As such, optical controller 16*d* monitors the interaction to determine the temperature, strain, or both along first fiber optic cable 26*d*. While optical controller 16*d* is described as including optical transmitter 20*d* and probe transmitter 54*d*, it is understood that any optical controller 16*a*-16*j* may include an optical transmitter and a probe transmitter to provide an optical signal and a probe signal to first fiber optic cables 26*a*-26*j* (best seen in FIG. 2A).

Figure 2D:
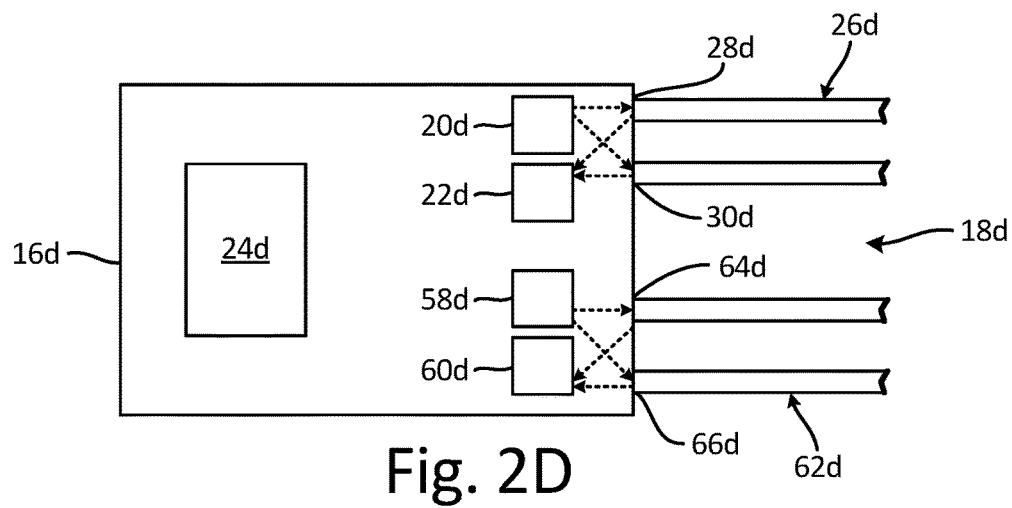
FIG. 2D is an enlarged view of a third embodiment of detail Y in FIG. 2A including a reference configuration.

FIG. 2D is an enlarged view of detail Y of FIG. 2A, showing optical controller 16*d* in a reference configuration. In the reference configuration, an optical signal is provided to a first fiber optic cable and a reference signal is provided to a reference fiber optic cable, which runs parallel to the first fiber optic cable. The optical signal and the reference signal are both received at an optical controller and combined. The interaction of the optical signal with the reference signal creates an interference pattern, which can then be analyzed to obtain temperature data, strain data, or both. FIG. 2D includes optical controller 16*d*, fiber optic loop 18*d*, optical transmitter 20*d*, optical receiver 22*d*, computer-readable memory 24*d*, reference transmitter 58*d*, and reference receiver 60*d*. Fiber optic loop 18*d* includes first fiber optic cable 26*d* and reference fiber optic cable 62*d*. First fiber optic cable 26*d* includes first end 28*d* and second end 30*d*. Similarly, reference fiber optic cable 62*d* includes first end 64*d* and second end 66*d*.

Fiber optic loop 18*d* extends through zone Zd (best seen in FIG. 2A). First fiber optic cable 26*d* and reference fiber optic cable 62*d* run parallel through zone Zd. First end 28*d* of first fiber optic cable 26*d* is connected to optical controller 16*d* and configured to receive an optical signal from optical transmitter 20*d*. Similarly, first end 64*d* of reference fiber optic cable 62*d* is connected to optical controller 16*d* and configured to receive a reference signal from reference transmitter 58*d*. While first fiber optic cable 26*d* is described as receiving an optical signal from optical transmitter 20*d* and reference fiber optic cable 62*d* is described as receiving a reference signal from reference transmitter 58*d*, it is understood that a single optical transmitter may provide both the optical signal to first fiber optic cable 26*d* and the reference signal to reference fiber optic cable 62*d*.

Second end 30*d* of first fiber optic cable 26*d* is connected to optical controller 16*d* to provide the optical signal to optical receiver 22*d*. Similarly, second end 66*d* of reference fiber optic cable 62*d* is connected to optical controller 16*d* to provide the reference signal to reference receiver 60*d*. It is understood that while second end 30*d* of first fiber optic cable 26*d* provides the optical signal to optical receiver 22*d*, a second optical receiver may be connected to first end 28*d* to receive any backscattering of the optical signal through first end 28*d*. Similarly, a second reference receiver may receive any backscattering of reference signal through first end 64*d* of reference fiber optic cable 62*d*.

Optical controller 16*d* receives both the optical signal and the reference signal and combines the optical signal and the reference signal to generate an interference pattern. Optical controller 16*d* analyzes the combined optical signal and reference signal to determine temperature changes, strain changes, or both along fiber optic loop 18*d*. It is understood that optical controller 16*d* can combine the optical signal received at second end 30*d* with the reference signal received at second end 66*d*, or can combine the backscattered optical signal received at first end 30*d* with the backscattered reference signal received at first end 64*d*. While fiber optic loop 18*d* is described as including first fiber optic cable 26*d* and reference fiber optic cable 62*d*, it is understood that any fiber optic loop 18*a*-18*j* may include a first fiber optic cable and a reference fiber optic cable. As such, any optical controller 16*a*-16*j* may be configured to combine and analyze an optical signal and a reference signal.

Figure 3:
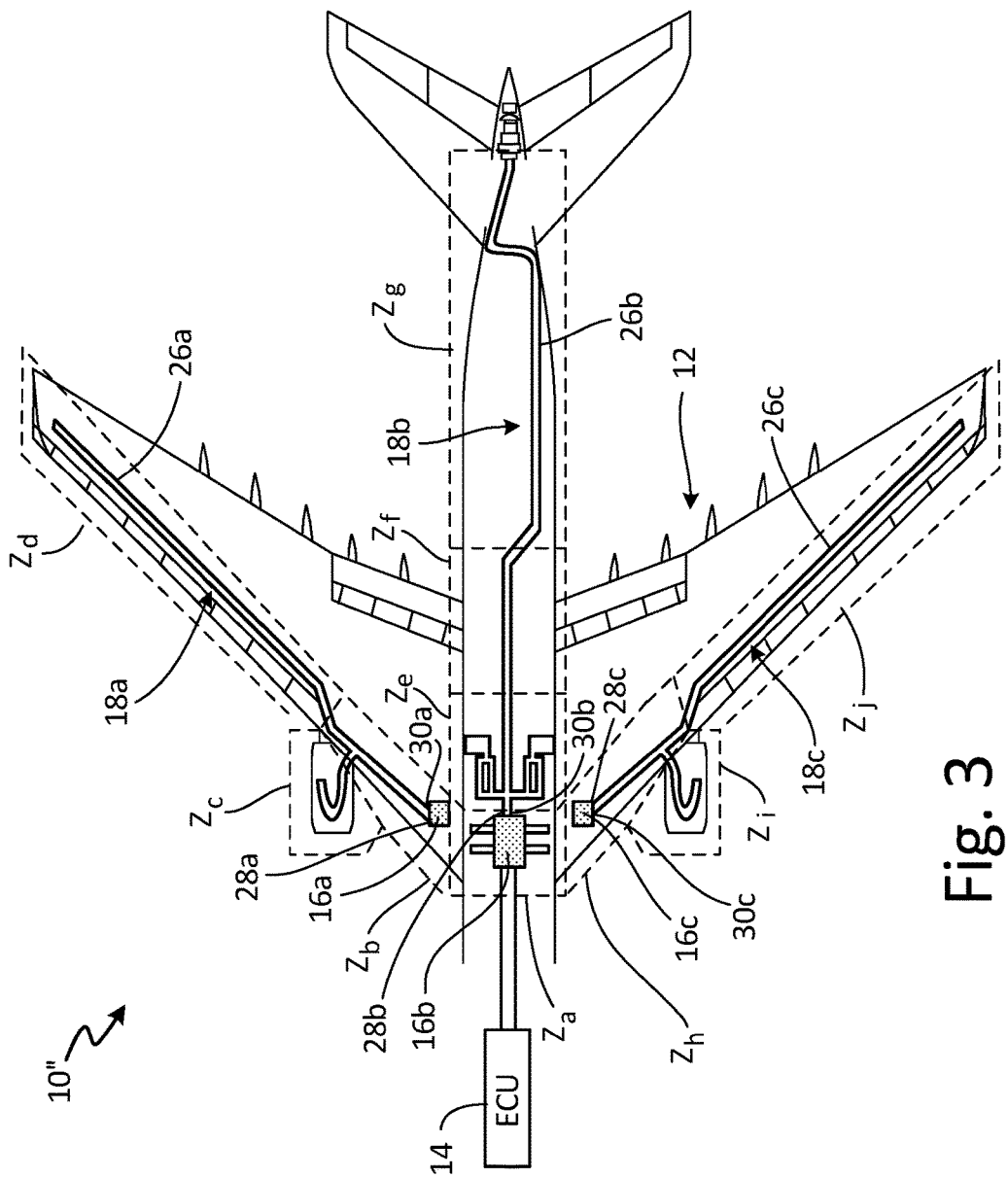
FIG. 3 is a schematic view of an overheat detection system architecture for monitoring multiple zones.

FIG. 3 is a schematic diagram of overheat detection system 10" for aircraft 12. Aircraft 12 includes zones Za-Zj and avionics controller 14. Overheat detection system 10" includes optical controllers 16*a*-16*c* and fiber optic loops 18*a*-18*c*. Fiber optic loops 18*a*-18*c* include first fiber optic cables 26*a*-26*c*, and first fiber optic cables 26*a*-26*c* include first ends 28*a*-28*c* and second ends 30*a*-30*c*.

In overheat detection system 10" fiber optic loop 18*a* passes through zones Zb-Zd, and fiber optic loop 18*a* is connected to optical controller 16*a*. Fiber optic loop 18*b* passes through zones Za and Ze-Zg and fiber optic loop 18*b* is connected to optical controller 16*b*. Fiber optic loop 18*c* passes through zones Zh-Zj, and fiber optic loop 18*c* is connected to optical controller 16*c*. As such, each fiber optic loop 18*a*-18*c* passes through and gathers information regarding multiple zones of aircraft 12.

Different systems within aircraft 12 require overheat detection monitoring, and each system may be divided into multiple zones. For example, a bleed air duct in aircraft 12 may include multiple zones with a single fiber optic loop extending through all of the zones of the bleed air duct. Each system may thus be divided into multiple zones and may include a dedicated optical controller and fiber optic loop. It is understood, however, that aircraft 12 may be divided into zones in any desired manner.

Optical controllers 16*a*-16*c* can communicate with avionics controller 14, and avionics controller 14 can consolidate the information received from optical controllers 16*a*-16*c* and provide the information to the cockpit, provide the information to maintenance personnel, or store the information to generate trend data. While optical controllers 16*a*-16*c* are described as communicating with avionics controller 14, it is understood that optical controllers 16a-16c can communicate directly with the cockpit or ground personnel, can store the information to generate trend data, and can communicate with a central overheat computer. It is understood that all communications for overheat detection system 10 can be made using wired, wireless, or optical communications or some combination of these methods.

Fiber optic loops 18a-18c are similar, and for purposes of clarity and ease of discussion, fiber optic loop 18a will be discussed in further detail. Fiber optic loop 18a passes through each of zones Zb-Zd and is connected to optical controller 16a. First fiber optic cable 26a receives an optical signal from optical transmitter 20a located within optical controller 16a and transmits the optical signal to optical receiver 22a located within optical controller 16a. Optical controller 16a analyzes the signal received by optical receiver 22a to determine the temperature in zones Zb-Zd. Each zone Zb-Zd may have a different alarm set point as the temperature resistance of each zone may differ. As such, optical controller 16a analyzes the information received to determine the temperature in each zone. In addition to determining temperature in zones Zb-Zd, optical controller 16a can analyze the information received from first fiber optic cable 26a to determine the strain experienced in each zone Zb-Zd. Optical controller 16a can thus monitor temperature, strain, or both within zones Zb-Zd. While fiber optic loop 18a is described as including first fiber optic cables 26a in a loop configuration, it is understood that first fiber optic cable 26a can be disposed in a single-ended configuration such that only one of first end 28a and second end 30a is connected to optical controller 16a. For example, in the single-ended configuration where first end 28a is connected to optical controller 16a, optical controller 16a can provide an optical signal to first end 28a of first fiber optic cable 26a and can interpret the signal that is reflected back through first end 28a.

With continued reference to FIGS. 1-3, FIGS. 4-5 are flow diagrams illustrating example operations for determining the occurrence and location of an overheat event. For purposes of clarity and ease of discussion, the example operations are described below within the context of overheat detection system 10.

Figure 4:
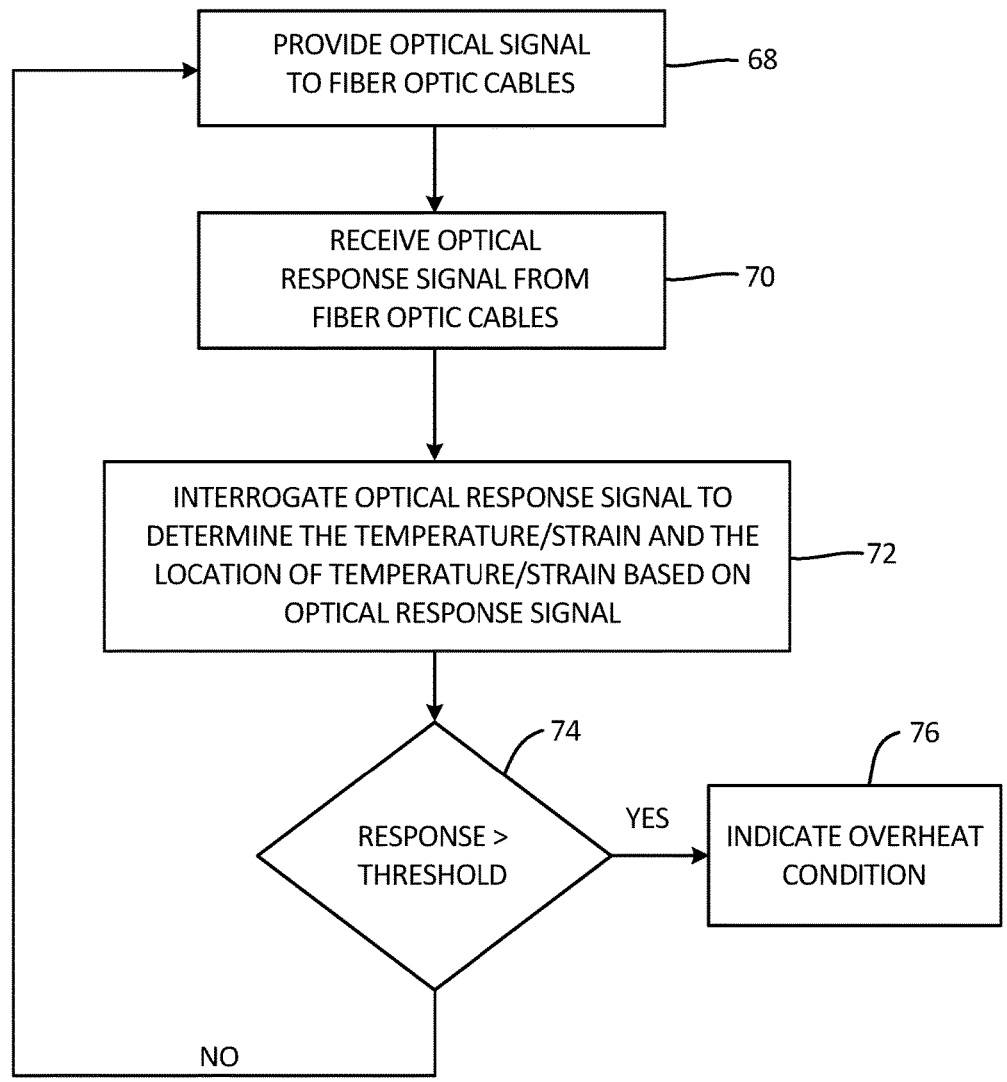
FIG. 4 is a flow diagram depicting an overheat detection process.

FIG. 4 is a flow diagram illustrating example operations to provide overheat detection in an aircraft utilizing optical signals. In step 68, an optical signal is provided to one or more fiber optic cables. For example, optical transmitter 20 can provide an optical signal to first fiber optic cable 26 through first end 28, second end 30, or both of fiber optic cable 26. In step 70, an optical response signal is received from the fiber optic cable. For instance, optical receiver 22 may receive the optical response signal from first fiber optic cable 26, and optical receiver 22 may provide the optical response signal to optical controller 16. In step 72, the optical response signal is analyzed to determine the temperature, strain, or both along the fiber optic cable. For example, optical controller 16 may analyze the optical response signal received from optical receiver 22 to determine the actual temperature and/or strain at various locations along first fiber optic cable 26. Optical controller 16 may use any suitable method to analyze the optical response, such as the methods discussed below. It is understood that first fiber optic cable 26 may sense a temperature at any location along first fiber optic cable 26 and the optical signal can be interrogated to determine the precise location that a temperature change occurs at. As such, the temperature data analyzed by optical controller 16 may include information to determine a temperature at a single location within a zone, a temperature at multiple locations throughout a zone, a temperature profile for a zone, or any other temperature information for the zone. In step 74, the temperature data and/or strain data generated in step 72 is compared against a threshold. Where the temperature data and/or strain data indicates that the temperature and/or strain are below the threshold level, the operation returns to step 68. Where the temperature data and/or strain data indicates that the temperature and/or strain are above the threshold level, the operation proceeds to step 76 and the existence of the overheat condition is indicated and communicated to the cockpit and/or ground personnel.

Figure 5:
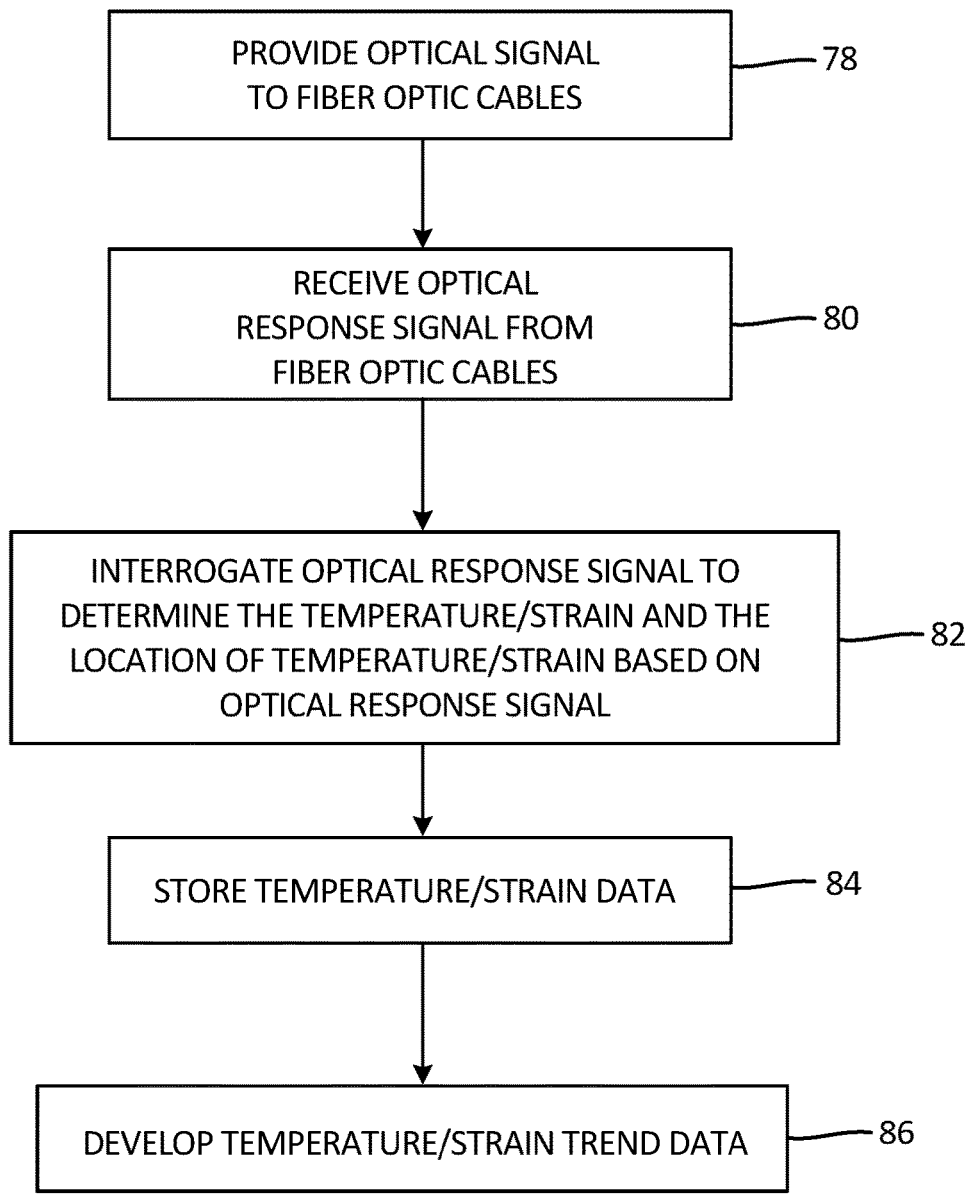
FIG. 5 is a flow diagram depicting an overheat detection process.

FIG. 5 is a flow diagram illustrating example operations using optical signals to provide health monitoring for an aircraft. In step 78, an optical signal is provided to one or more fiber optic cables. In step 80, an optical response signal is received from the fiber optic cable. In step 82, the optical response signal is analyzed to determine the temperature, strain, or both experienced along the fiber optic cable. In step 84, the temperature data, strain data, or both is stored in a memory. For example, temperature data may be stored in memory 24 of optical controller 16. In step 86, trends are developed for the stored temperature data and/or strain data, and the trends are monitored for any patterns indicating that a maintenance action is necessary.

By utilizing fiber optic loop 18 to determine the existence of an overheat event, prior art eutectic salt sensors, and therefore the electrical connections associated with the eutectic salt sensors, may be eliminated from aircraft 12. The prior art eutectic salt sensors sense whether an overheat event is or is not occurring, and as such provide a binary response. Unlike the prior art eutectic sensors, fiber optic loop 18 senses any changes in temperature and the location of the temperature change, not merely whether a temperature set point has been exceeded. As such, optical controller 16 may gather trend data for each zone that fiber optic loop 18 extends through, as data is continuously gathered by optical controller 16. Temperature trend data provides information to maintenance personnel regarding the overall health of each zone Za-Zj. Providing the trend data allows for maintenance to be performed at specific, relevant locations and only when needed, thereby decreasing the downtime of aircraft 12. In addition to providing temperature trend data, fiber optic loop 18 is able to sense strain within each zone Za-Zj, unlike the prior art eutectic salt sensors that are sensitive to temperature alone. Utilizing fiber optic loop 18 thus provides additional structural information to maintenance personnel.

Monitoring the temperature trend, strain trend, or both within zones Za-Zj provides information regarding the overall health of the zone being monitored, and of the system within which the zone is located. The trend data can be used to facilitate preventative maintenance. Moreover, monitoring the trend data allows for maintenance actions to be scheduled at a convenient time and location, instead of waiting until an actual failure occurs, which leads to gate departure delay, cancelled flights, or in-flight crew action. In addition, monitoring the actual temperature in zones Za-Zj enables overheat detection system 10 to provide fire monitoring in addition to overheat detection. A sudden, dramatic increase in temperature can indicate the existence of a fire instead of an overheat event. For example, a fire in a wheel well would cause a sudden, dramatic increase in temperature in the wheel well, and that sudden, dramatic increase would be sensed by the portion of the fiber optic cable passing through the zone that includes the wheel well. Optical controller 16 can analyze the data provided from the zone that includes the wheel well to determine the existence of the fire event, and to communicate the existence of the fire event to the cockpit, to a fire suppression system, or to any other appropriate system or personnel.

A variety of fiber optic cables and operating principles may be used to determine the existence of an overheat event. For example, overheat detection system 10 may utilize a single fiber optic cable, dual fiber optic cables, and fiber optic cables including Bragg gratings. Moreover, the fiber optic cables may be arranged in a single loop configuration, a dual loop configuration, or any other suitable configuration. An optical signal is initially provided to first fiber optic cable 26, and as the optical signal travels through first fiber optic cable 26 the majority of the optical signal travels from first end 28 to second end 30, but a fraction of the optical signal is backscattered towards first end 28. Optical controller 16 can analyze the portion of the optical signal received through second end 30, the portion of the optical signal backscattered through first end 28, or a combination of both to determine temperature and/or strain information. As such, it is further understood that first fiber optic cable 26 can be arranged in a single-ended configuration where one of first end 28 or second end 30 is connected to optical controller 16. In a single-ended configuration, optical controller 16 can provide the optical signal through one end of first fiber optic cable 26 and can interpret the portion of the optical signal backscattered through the end of first fiber optic cable 26 connected to optical controller 16.

Where fiber optic loop 18 includes Bragg gratings, optical controller 16 can analyze the optical signal using a variety of principles, including Wave Division Multiplexing (WDM), Time Division Multiplexing (TDM), a combination of WDM and TDM (WDM/TDM), and Coherent Optical Frequency Domain Reflectometry (COFDR), among others. A Bragg grating is a distributed reflector within the fiber optic cable that is configured to reflect a particular wavelength of light and allow all other wavelengths to pass through. As such, the Bragg gratings function as wavelength-specific reflectors. The specific wavelength reflected by a specific Bragg grating is the Bragg wavelength. In overheat detection system 10, fiber optic loop 18 includes various Bragg gratings within first fiber optic cable 26. Different Bragg gratings may be disposed within different zones in the aircraft. As such, the Bragg wavelength associated with each zone differs from the Bragg wavelength associated with the other zones. Because optical controller 16 knows which Bragg wavelength is associated with which zone, optical controller 16 may determine the distance to each Bragg grating based on the time taken for the Bragg wavelength to travel from first end 28, to the Bragg grating, and back to first end 28. The Bragg wavelength is sensitive to both strain and temperature. Changes in strain and temperature result in a shift in the Bragg wavelength, which can be detected by optical controller 16 and used to determine the change in strain and/or temperature.

In WDM, optical controller 16 provides an optical signal to first end 28 of first fiber optic cable 26 with optical transmitter 20. Optical transmitter 20 is preferably a tunable, swept-wavelength laser. The wavelength of optical transmitter 20 is swept across a pre-defined range. The wavelength of the optical signal being transmitted at any given moment in time is known. The Bragg wavelengths are received at first end 28 of first fiber optic cable 26 by optical receiver 22, and optical controller 16 converts changes in the Bragg wavelengths into intensity vs. time. A shift in the Bragg wavelength indicates a change in temperature and/or strain, and tracking the changes in the Bragg wavelength allows optical controller 16 to determine the temperature at each Bragg grating within each zone $Z_1$-$Z_n$.

In TDM, optical controller 16 provides an optical signal to first end 28 of first fiber optic cable 26 with optical transmitter 20. In TDM, optical transmitter 20 is a broadband laser light source such that a multitude of wavelengths are transmitted through first fiber optic cable 26. Each Bragg grating is configured to reflect a particular Bragg wavelength. Optical controller 16 monitors the time required for the each Bragg wavelength to return to first end 28. The time required for each Bragg wavelength to return to first end 28 provides the location of each Bragg grating in first fiber optic cable 26. Having established the location of each Bragg grating in first fiber optic cable 26, optical transmitter 20 provides pulses through first fiber optic cable 26. The wavelength of each pulse can be determined when the pulse arrives back optical controller 16. Changes in the wavelength are detected and converted to intensity verses time, thereby allowing optical controller 16 to determine the temperature at the location of each Bragg grating in first fiber optic cable 26.

In WDM/TDM, optical controller 16 provides optical signals through first fiber optic cable 26 utilizing both a tunable, swept-wavelength laser and a broadband laser light source. Similar to both WDM and TDM, in WDM/TDM the reflected Bragg wavelengths are monitored for any changes in the wavelengths. The changes in the wavelengths are converted to intensity verses time, thereby allowing optical controller 16 to determine the temperature at the location of each Bragg grating. WDM/TDM reduces the loss of any signal in the Bragg Grating is reduced and the total wavelength that must be scanned to interrogate the Bragg wavelength is similarly reduced.

In COFDR, optical transmitter 20 is preferably a tunable pulse laser. Fiber optic loop 18 includes first fiber optic cable 26 and a reference fiber optic cable running parallel to first fiber optic cable 26. It is understood that optical controller 16 may include a first optical transmitter dedicated to first fiber optic cable 26 and a second optical transmitter dedicated to the reference fiber optic cable. Both first fiber optic cable 26 and the reference fiber optic cable 62 include Bragg gratings at the same distance within the fiber optic cable from optical transmitter 20. The reflected Bragg wavelengths from first fiber optic cable 26 and the reference fiber optic cable are combined by optical controller 16 and the combined signals are analyzed. Optical controller 16 may perform an Inverse Fast Fourier Transform (IFFT) on the fringe interference pattern to obtain the location and frequencies of the reflected Bragg wavelengths. Temperature changes cause the Bragg wavelength to shift, and the shift in the Bragg wavelength is analyzed by optical controller 16 to determine the temperature shift, and thereby whether an overheat event has occurred. In addition, the location of the overheat event is detected by optical controller 16 based on the shift in a particular Bragg wavelength, as the location of a Bragg grating associated with a Bragg wavelength is known.

Where fiber optic loop 18 is a continuous fiber optic loop, optical controller 16 can analyze the optical signal using any suitable method, including Optical Time Domain Reflectometry (OTDR), COFDR, Brillouin Optical Frequency Domain Analysis (BOFDA), Brillouin Optical Time Domain Analysis (BOTDA), Incoherent Optical Frequency Domain Reflectometry (IOFDR) utilizing a Swept Frequency Methodology, and IOFDR utilizing a Step Frequency Methodology.

In OTDR, optical controller 16 commands optical transmitter 20 to send a single laser pulse, having a fixed wavelength, down first fiber optic cable 26. In one example, Raman scattering, which is the inelastic scattering of a photon upon interaction with matter, that occurs is utilized to determine temperature. It is understood, however, that in addition to determining temperature along fiber optic loop 18, OTDR can be utilized to locate the occurrence of an event at a location along fiber optic loop 18. In Raman scattering, the scattered photons have a different wavelength than the incident photons. Raman scattering includes two types of scattering, Stokes scattering, whereby the scattered photon has a longer wavelength, and thus less energy, than the incident photon, and anti-Stokes scattering, whereby the scattered photon has a shorter wavelength, and thus more energy, than the incident photon. The intensity of the anti-Stokes band is temperature dependent, while the intensity of the Stokes band is temperature insensitive. As such, a ratio of the Stokes to anti-Stokes components is measured to determine the temperature at locations along fiber optic loop 18. The location of the temperature shift may be determined by the time required for the backscattered photons to return to optical controller 16.

In addition to using COFDR to analyze optical signals sent through fiber optic cables that include Bragg gratings, COFDR may be used to analyze optical signals sent through fiber optic cables not including Bragg gratings. Similar to COFDR for fiber optic cables including Bragg gratings, COFDR for fiber optic cables without Bragg gratings includes using a fiber optic loop 18 having first fiber optic cable 26 and a reference fiber optic cable running parallel to first fiber optic cable 26. As the optical signal is transmitted through first fiber optic cable 26, some photons are backscattered and reflected back optical controller 16. Similarly, as the reference signal is transmitted through the reference cable, some reference photons are backscattered and reflected back to optical controller 16. Optical controller 16 combines the backscattered optical signal and the backscattered reference signal and the combined signals create an interference pattern. Optical controller 16 may perform an Inverse Fast Fourier Transform (IFFT) on a fringe interference pattern to obtain the location and frequencies of the reflected wavelengths to create a Rayleigh fingerprint. Temperature changes cause the Rayleigh fingerprint to stretch, thereby shifting the reflected wavelength. The shift in the reflected wavelength is analyzed by optical controller 16 to determine temperature shift, strain shift, or both, and optical controller 16 may thereby determine whether an overheat event has occurred.

In both BOFDA and BOTDA, an optical signal is provided to first end 28 of first fiber optic cable 26 and a probe signal is simultaneously provided to second end 30 of first fiber optic cable 26. Optical controller 16 controls both optical transmitter 20 and a probe transmitter. Optical transmitter 20 is preferably a pump laser configured to provide laser pulses to first end 28 of first fiber optic cable 26. The probe transmitter provides a continuous wave to second end 30 of first fiber optic cable 26. The optical signal interacts with the probe signal, and a frequency difference between the optical signal and the purge signal is the Brillouin frequency. Changes in the Brillouin frequency are recorded over time, which allows optical controller 16 to determine the temperature at a given location along first fiber optic cable 26 and determine the distance that the given location is from first end 28 or second end 30. In BOFDA, optical controller 16 analyzes the resultant Brillouin frequency with respect to frequency, while in BOTDA optical controller 16 analyzes the resultant Brillouin frequency with respect to changes over time.

In IOFDR, a pulsed optical signal is provided to first fiber optic cable 26 by optical transmitter 20. The pulsed optical signal is intensity modulated at constant amplitude. IOFDR may utilize a swept-frequency methodology or a step-frequency methodology. In the swept-frequency methodology, a frequency of the optical signal provided by optical transmitter 20 is swept continuously across a specified frequency range. In the step-frequency methodology, the frequency of the optical signal provided by optical transmitter 20 is altered periodically in incremental steps over a specified frequency range.

In IOFDR using either the swept-frequency methodology or the step-frequency methodology Raman scattering is utilized to determine the temperature along first fiber optic cable 26. As discussed above, Raman scattering includes two component types of scattering, a Stokes component and an anti-Stokes component. The Stokes component includes scattered photons that have a longer wavelength, and thus less energy, than the incident photon. The anti-Stokes component includes scattered photons that have a shorter wavelength, and thus more energy, than the incident photon. The anti-Stokes component is temperature dependent, while the Stokes band is temperature insensitive. The intensity of the backscattered Raman signal, which is a combination of Stokes and anti-Stokes components, is measured as a function of frequency. Optical controller 16 performs an IFFT to convert the signal frequency to the space domain, from which the temperature is calculated. The ratio of Stokes to anti-Stokes intensities eliminates any non-temperature related variations to the signal, thereby giving a temperature reading unaffected by noise.

DISCUSSION OF POSSIBLE EMBODIMENTS

The following are non-exclusive descriptions of possible embodiments of the present invention.

A system configured to monitor temperature in a plurality of zones of an aircraft can include a first fiber optic cable routed through each of the plurality of zones of the aircraft system, an optical transmitter configured to provide an optical signal to the first fiber optic cable, an optical receiver configured to receive an optical response from the first fiber optic cable, and a controller operatively connected to the optical receiver and configured to determine at least one temperature for each of the plurality of zones based on the optical response and output an indication for detected zones of the plurality of zones in which the at least one temperature is greater than a threshold value.

The system of the preceding paragraph can optionally include, additionally and/or alternatively, any one or more of the following features, configurations and/or additional components:

The first fiber optic cable can include fiber Bragg gratings.

The controller can be configured to control the optical transmitter and determine the at least one temperature for each of the plurality of zones using time division multiplexing (TDM) and/or wavelength division multiplexing (WDM).

The system can further include a second fiber optic cable can be routed through the plurality of zones parallel to the first fiber optic cable, and the controller can be configured to provide a reference signal to the second fiber optic cable and receive a reference response from the second fiber cable.

The controller can be configured to determine the at least one temperature in each of the plurality of zones based upon the reference response, the optical response, and coherent optical frequency domain reflectometry (COFDR).

The first and second fiber optic cables can include fiber Bragg gratings.

The optical transmitter can be configured to produce laser pulses with a constant amplitude, and wherein the controller implements Incoherent Optical Frequency Domain Reflectometry (IOFDR) with a step frequency or swept frequency methodology.

The controller can be configured to control the optical transmitter to provide the optical signal as a single laser pulse at a fixed wavelength, and the controller can be configured to determine the at least one temperature of each of the plurality of zones using optical time domain reflectometry (OTDR).

The optical transmitter can be connected to provide the optical signal to a first end of the first fiber optic cable and the optical receiver can be connected to receive the optical response from a second end of the first fiber optic cable, the system can further include a probe transmitter connected to the second end of the first fiber optic cable and configured to provide a probe signal to the second end of the first fiber optic cable, and a probe receiver connected to the first end of the first fiber optic cable and configured to receive the probe signal from the first end of the first fiber optic cable, and the controller can be configured to determine the at least one temperature of each of the plurality of zones based on a frequency difference between the optical response and the probe response using Brillouin optical time domain analysis (BOTDA).

The aircraft system can be a bleed air system, and the plurality of zones comprise bleed air ducts.

At least one of the plurality of zones can comprise a wheel well of the aircraft, and a physical condition of the wheel well can be determined by the controller to determine a temperature of a landing gear tire.

A method of detecting thermal conditions for a plurality of zones of an aircraft system can include emitting, by an optical transmitter, an optical signal to a first fiber optic cable, wherein the first fiber optic cable is routed through each of the plurality of zones of the aircraft system, receiving, by an optical receiver, a response signal from the first fiber optic cable based upon the optical signal, determining, using a controller, at least one temperature of each of the plurality of zones based upon the response signal, and indicating a detected condition for detected zones of the plurality of zones in which the at least one temperature is greater than a threshold.

The method of the preceding paragraph can optionally include, additionally and/or alternatively, any one or more of the following features, configurations and/or additional components:

The first fiber optic cable can include fiber Bragg gratings, and wherein emitting, by the optical transmitter, the optical signal can include emitting the optical signal using a tunable, swept-wavelength laser; and wherein determining, using the controller, the at least one temperature for each of the plurality of zones comprises determining the at least one temperature based on wavelength division multiplexing (WDM).

The first fiber optic cable can include fiber Bragg gratings, and wherein emitting, by the optical transmitter, the optical signal comprises emitting the optical signal using a broadband laser; and wherein determining, using the controller, the at least one temperature of each of the plurality of zones comprises determining the at least one temperature based on time division multiplexing (TDM).

Emitting, by the optical transmitter, the optical signal can include emitting laser pulses having a constant amplitude using a step frequency methodology; and wherein determining, using the controller, the at least one temperature of each of the plurality of zones can include determining the at least one temperature based on optical frequency domain reflectometry (IOFDR).

Emitting, by the optical transmitter, the optical signal can include emitting laser pulses having a constant amplitude using a swept frequency methodology; and wherein determining, using the controller, the at least one temperature for each of the plurality of zones can include determining the at least one temperature based on optical frequency domain reflectometry (IOFDR).

The method can further include providing a reference signal to a second fiber optic cable routed parallel to the first fiber optic cable through the plurality of zones, and receiving a reference response from the second fiber cable based on the reference signal, wherein determining, using the controller, the at least one temperature of each of the plurality of zones can include determining the at least one temperature based upon the reference response, the optical response, and coherent optical frequency domain reflectometry (COFDR).

The first and second fiber optic cables can include fiber Bragg gratings.

Emitting, by the optical transmitter, the optical signal can include emitting the optical signal as a single laser pulse at a fixed wavelength, and determining, using the controller, the at least one temperature of each of the plurality of zones can include determining the at least one temperature for each of the plurality of zones using optical time domain reflectometry (OTDR).

Emitting, by the optical transmitter, the optical signal can include emitting the optical signal to a first end of the first fiber optic cable, and receiving, by the optical receiver, the response signal can include receiving the optical response from a second end of the first fiber optic cable, and the method can further include emitting, by a probe transmitter, a probe signal to the second end of the first fiber optic cable, and receiving, by a probe receiver, a probe response from the first end of the first fiber optic cable, and where determining, using the controller, the at least one temperature of each of the plurality of zones can include determining the at least one temperature of each of the plurality of zones based on a frequency difference between the optical response and the probe response using Brillouin optical time domain analysis (BOTDA).

An system for an aircraft having at least one zone can include a first zone fiber optic cable routed through a first zone of the at least one zone, a first local controller configured to provide an optical signal to the first zone fiber optic cable and obtain a response signal from the first zone fiber optic cable, wherein the first local controller is configured to determine at least one temperature for the first zone based on the response signal and provide an indication for the first zone if the at least one temperature for the first zone is greater than a threshold value.

The overheat detection system of the preceding paragraph can optionally include, additionally and/or alternatively, any one or more of the following features, configurations and/or additional components:

The system can further include a second zone of the at least one zone that includes a second zone fiber optic cable and a second local controller, and a main controller configured to communicate with the first controller and the second controller.

The first zone fiber optic cable can include fiber Bragg gratings.

The first local controller can be configured to control an optical transmitter to provide the optical signal as a tunable swept-wavelength laser and/or a broadband laser and is configured to determine the at least one temperature for each of the first zone using time division multiplexing (TDM) and/or wavelength division multiplexing (WDM).

The system can further include a reference fiber optic cable routed through the first zone parallel to the first zone fiber optic cable, wherein the first local controller can be configured to provide a reference signal to the reference fiber optic cable and receive a reference response from the reference fiber cable.

The first local controller can be configured to determine the at least one temperature of the first zone based upon the reference response, the response signal, and coherent optical frequency domain reflectometry (COFDR).

The first zone fiber optic cable and the reference fiber optic cable can include fiber Bragg gratings.

The first local controller can include an optical transmitter that is configured to produce laser pulses with a constant amplitude, wherein the first local controller can implement Incoherent Optical Frequency Domain Reflectometry (IOFDR) with a step frequency or swept frequency methodology.

The first local controller can include an optical transmitter configured to provide the optical signal as a single laser pulse at a fixed wavelength, wherein the local controller is can be configured to determine the at least one temperature of the first zone using optical time domain reflectometry (OTDR).

The first local controller can be configured to provide the optical signal to a first end of the first zone fiber optic cable and the first local controller can be configured to receive the response signal from a second end of the first zone fiber optic cable, and wherein the first local controller can be further configured to provide a probe signal to the second end of the first zone fiber optic cable and receive the probe signal from the first end of the first zone fiber optic cable, and wherein the first local controller can be configured to determine the temperature of the first zone based on a frequency difference between the response signal and the probe response using Brillouin optical time domain analysis (BOTDA).

The first zone can be a bleed air duct, cross-over bleed air duct, wheel well, wing box, air conditioning system, anti-icing system or nitrogen generation system.

A method of detecting thermal conditions for a zone of an aircraft system can include emitting, by a local controller, an optical signal to a zone fiber optic cable, wherein the zone fiber optic cable is routed through the zone of the aircraft system, receiving, by the local controller, a response signal from the zone fiber optic cable based upon the optical signal, determining, using the local controller, at least one temperature of the zone based upon the response signal, and indicating a condition for the zone if the at least one temperature for the zone is greater than a threshold.

The method of the preceding paragraph can optionally include, additionally and/or alternatively, any one or more of the following features, configurations and/or additional components:

Indicating the overheat condition can include indicating the overheat condition to an avionics controller of the aircraft.

The zone fiber optic cable can include fiber Bragg gratings, and emitting, by the local controller, the optical signal can include emitting the optical signal using a tunable, swept-wavelength laser, and wherein determining, using the local controller, the at least one temperature of the zone can include determining the at least one temperature based on wavelength division multiplexing (WDM).

The zone fiber optic cable can include fiber Bragg gratings, and emitting, by the local controller, the optical signal can include emitting the optical signal using a broadband laser, and wherein determining, using the controller, the at least one temperature of the zone can include determining the at least one temperature based on time division multiplexing (TDM).

Emitting, by the local controller, the optical signal can include emitting laser pulses having a constant amplitude using a step frequency methodology, and determining, using the local controller, the at least one temperature of the zone can include determining the at least one temperature based on optical frequency domain reflectometry (IOFDR).

Emitting, by the local controller, the optical signal can include emitting laser pulses having a constant amplitude using a swept frequency methodology, and determining, using the local controller, the at least one temperature of the zone can include determining the at least one temperature based on optical frequency domain reflectometry (IOFDR).

The method can further include providing a reference signal to a second fiber optic cable configured to run parallel to the zone fiber optic cable through the zone, and receiving a reference response from the second fiber cable based on the reference signal, wherein determining, using the local controller, the at least one temperature of the zone can include determining the at least one temperature based upon the reference response, the response signal, and coherent optical frequency domain reflectometry (COFDR).

Emitting, by the local controller, the optical signal can include emitting the optical signal as a single laser pulse at a fixed wavelength, wherein determining, using the local controller, the at least one temperature of the zone can include determining the at least one temperature of each of the zone using optical time domain reflectometry (OTDR).

Emitting, by the local controller, the optical signal can include emitting the optical signal to a first end of the first fiber optic cable, and receiving, by the local controller, the response signal can include receiving the response signal from a second end of the first fiber optic cable, and the method can further include providing a probe signal to the second end of the first fiber optic cable, and receiving a probe response from the first end of the first fiber optic cable, and wherein determining, using the local controller, the at least one temperature of the zone can include determining the at least one temperature of the zone based on a frequency difference between the response signal and the probe response using Brillouin optical time domain analysis (BOTDA).

A system for an aircraft that includes a plurality of zones includes a first zone fiber optic cable routed through a first set of the plurality of zones, a first local controller configured to provide a first optical signal to the first zone fiber optic cable and obtain a first response signal from the first zone fiber optic cable, and wherein the first local controller is further configured to determine at least one temperature for each of first set of the plurality of zones based on the first response signal and provide an indication for first detected zones of the first set of the plurality of zones in which the at least one temperature is greater than a threshold value.

The overheat detection system of the preceding paragraph can optionally include, additionally and/or alternatively, any one or more of the following features, configurations and/or additional components:

The system can further include a second zone fiber optic cable routed through a second set of the plurality of zones, a second local controller configured to provide a second optical signal to the second zone fiber optic cable and obtain a second response signal from the second zone fiber optic cable, and wherein the second local controller is further configured to determine at least one temperature for each of the second set of the plurality of zones based on the second response signal and provide an indication for second detected zones of the second set of the plurality of zones in which the at least one temperature is greater than a threshold value.

The system can further include a main controller configured to communication with the first and second local controllers, wherein the first and second local controllers provide the indication for the first and second detected zones to the main controller.

The first zone fiber optic cable can include fiber Bragg gratings, and the first local controller can be configured to control an optical transmitter to provide the optical signal as a tunable swept-wavelength laser and/or a broadband laser and can be configured to determine the at least one temperature for each of the first set of the plurality of zones using time division multiplexing (TDM) and/or wavelength division multiplexing (WDM).

The system can further include a reference fiber optic cable routed through each of the first set of the plurality of zones parallel to the first zone fiber optic cable, and wherein the first local controller can be configured to provide a reference signal to the reference fiber optic cable and receive a reference response from the reference fiber cable.

The first local controller can be configured to determine the at least one temperature of each of the first set of the plurality of zones based upon the reference response, the optical response, and coherent optical frequency domain reflectometry (COFDR).

The first zone fiber optic cable and the reference fiber optic cable can include fiber Bragg gratings.

The first local controller can include an optical transmitter that is configured to produce laser pulses with a constant amplitude, and wherein the first local controller can implement Incoherent Optical Frequency Domain Reflectometry (IOFDR) with a step frequency or swept frequency methodology.

The first local controller can include an optical transmitter configured to provide the first optical signal as a single laser pulse at a fixed wavelength, and wherein the first local controller can be configured to determine the at least one temperature of each of the first set of the plurality of zones using optical time domain reflectometry (OTDR).

The first local controller can be configured to provide the first optical signal to a first end of the first zone fiber optic cable and the first local controller can be configured to receive the first response signal from a second end of the first zone fiber optic cable, and wherein the first local controller can be further configured to provide a probe signal to the second end of the first zone fiber optic cable and receive the probe signal from the first end of the first zone fiber optic cable, and wherein the first local controller can be configured to determine the at least one temperature for each of the first set of the plurality of zones based on a frequency difference between the response signal and the probe response using Brillouin optical time domain analysis (BOTDA).

Each of the first set of the plurality of zones can be one of a bleed air duct, cross-over bleed air duct, wheel well, wing box, air conditioning system, anti-icing system or nitrogen generation system.

A method of detecting thermal conditions for an aircraft can include emitting, by a first local controller, a first optical signal to a first zone fiber optic cable, wherein the first zone fiber optic cable is routed through each of a first plurality of zones of the aircraft, receiving, by the first local controller, a response signal from the first zone fiber optic cable based upon the first optical signal, determining, using the first local controller, at least one temperature for each of the first plurality of zones based on the response signal, and indicating a first condition for a respective one of the first plurality of zones if the at least one temperature for the respective one of the first plurality of zones is greater than a threshold.

The method of the preceding paragraph can optionally include, additionally and/or alternatively, any one or more of the following features, configurations and/or additional components:

The method can further include emitting, by a second local controller, a second optical signal to a second zone fiber optic cable, wherein the second zone fiber optic cable is routed through each of a second plurality of zones of the aircraft, receiving, by the second local controller, a response signal from the second zone fiber optic cable based upon the second optical signal, determining, using the second local controller, at least one temperature for each of the second plurality of zones based on the response signal, and indicating a second condition for a respective one of the second plurality of zones if the at least one temperature for the respective one of the second plurality of zones is greater than a threshold.

Indicating the first condition can include indicating the first condition to an avionics controller of the aircraft, and wherein indicating the second condition can include indicating the second condition to the avionics controller.

The first zone fiber optic cable can include fiber Bragg gratings, and emitting, by the first local controller, the first optical signal can include emitting the first optical signal using a tunable, swept-wavelength laser, and wherein determining, using the first local controller, the at least one temperature each of the plurality of zones can include determining the at least one temperature based on wavelength division multiplexing (WDM).

The first zone fiber optic cable can include fiber Bragg gratings, and emitting, by the first local controller, the first optical signal can include emitting the first optical signal using a broadband laser, and determining, using the first local controller, the at least one temperature of each of the first plurality of zones can include determining the at least one temperature based on time division multiplexing (TDM).

Emitting, by the first local controller, the first optical signal can include emitting laser pulses having a constant amplitude using a step frequency methodology, and determining, using the first local controller, the at least one temperature of each of the first plurality of zones can include determining the at least one temperature based on optical frequency domain reflectometry (IOFDR).

Emitting, by the first local controller, the first optical signal can include emitting laser pulses having a constant amplitude using a swept frequency methodology, and determining, using the first local controller, the at least one temperature of each of the first plurality of zones can include determining the at least one temperature based on optical frequency domain reflectometry (IOFDR).

The method can further include providing a reference signal to a second fiber optic cable configured to run parallel to the first zone fiber optic cable through each of the first plurality of zones, and receiving a reference response from the second fiber cable based on the reference signal, wherein determining, using the first local controller, the at least one temperature of each of the first plurality of zones can include determining the at least one temperature based upon the reference response, the first optical response, and coherent optical frequency domain reflectometry (COFDR).

Emitting, by the first local controller, the first optical signal can include emitting the first optical signal to a first end of the first zone fiber optic cable, and wherein receiving, by the first local controller, the response signal can include receiving the first optical response from a second end of the first zone fiber optic cable, and the method can further include providing a probe signal to the second end of the first zone fiber optic cable, and receiving a probe response from the first end of the first zone fiber optic cable, and wherein determining, using the first local controller, the at least one temperature of each of the first plurality of zones can include determining the at least one temperature based on a frequency difference between the first optical response and the probe response using Brillouin optical time domain analysis (BOTDA).

A health monitoring system of an aircraft can include a first fiber optic cable routed through at least one zone of the aircraft, an optical transmitter configured to provide an optical signal to the first fiber optic cable, an optical receiver configured to receive an optical response from the first fiber optic cable, and a controller operatively connected to the optical receiver and configured to determine a physical characteristic for the at least one zone based on the optical response, and store a plurality of values of the physical characteristic over a time period in a memory.

The health monitoring system of the preceding paragraph can optionally include, additionally and/or alternatively, any one or more of the following features, configurations and/or additional components:

The first fiber optic cable can include fiber Bragg gratings.

The controller can be configured to control the optical transmitter and determine the physical characteristic for the at least one zone using time division multiplexing (TDM) and/or wavelength division multiplexing (WDM).

The system can further include a second fiber optic cable routed through the at least one zone parallel to the first fiber optic cable, wherein the controller can be configured to provide a reference signal to the second fiber optic cable and receive a reference response from the second fiber cable.

The controller can be configured to determine the physical characteristic based upon the reference response, the optical response, and coherent optical frequency domain reflectometry (COFDR).

The first and second fiber optic cables can include fiber Bragg gratings.

The optical transmitter can be configured to produce laser pulses with a constant amplitude, and wherein the controller can implement Incoherent Optical Frequency Domain Reflectometry (IOFDR) with a step frequency or swept frequency methodology.

The controller can be configured to control the optical transmitter to provide the optical signal as a single laser pulse at a fixed wavelength, and wherein the controller can be configured to determine the physical characteristic of the at least one zone using optical time domain reflectometry (OTDR).

The optical transmitter can be connected to provide the optical signal to a first end of the first fiber optic cable and the optical receiver can be connected to receive the optical response from a second end of the first fiber optic cable, and the system can further include a probe transmitter connected to the second end of the first fiber optic cable and configured to provide a probe signal to the second end of the first fiber optic cable, and a probe receiver connected to the first end of the first fiber optic cable and configured to receive the probe signal from the first end of the first fiber optic cable, wherein the controller can be configured to determine the physical characteristic of the at least one zone based on a frequency difference between the optical response and the probe response using Brillouin optical time domain analysis (BOTDA).

The at least one zone can be one of a bleed air duct, cross-over bleed air duct, wheel well, wing box, air conditioning system, anti-icing system or nitrogen generation system.

The physical characteristic can be a temperature or a strain.

A method of monitoring the health of an aircraft can include emitting, by an optical transmitter, an optical signal to a first fiber optic cable, wherein the first fiber optic cable is routed through at least one zone of the aircraft, receiving, by an optical receiver, a response signal from the first fiber optic cable based upon the optical signal, determining, using a controller, a physical characteristic of the at least one zone, storing, in a memory, a plurality of values of the physical characteristic for the at least one zone, and determining a trend for the physical characteristic based on the plurality of values.

The method of the preceding paragraph can optionally include, additionally and/or alternatively, any one or more of the following features, configurations and/or additional components:

The first fiber optic cable can include fiber Bragg gratings, wherein emitting, by the optical transmitter, the optical signal can include emitting the optical signal using a tunable, swept-wavelength laser, and wherein determining, using the controller, the physical characteristic of the at least one zone can include determining the physical characteristic based on wavelength division multiplexing (WDM).

The first fiber optic cable can include fiber Bragg gratings, and wherein emitting, by the optical transmitter, the optical signal can include emitting the optical signal using a broadband laser, and wherein determining, using the controller, the physical characteristic of the at least one zone can include determining the physical characteristic based on time division multiplexing (TDM).

Emitting, by the optical transmitter, the optical signal can include emitting laser pulses having a constant amplitude using a step frequency methodology, and determining, using the controller, the physical characteristic of the at least one zone can include determining the physical characteristic based on optical frequency domain reflectometry (IOFDR).

Emitting, by the optical transmitter, the optical signal can include emitting laser pulses having a constant amplitude using a swept frequency methodology, and determining, using the controller, the physical characteristic of the at least one zone can include determining the physical characteristic based on optical frequency domain reflectometry (IOFDR).

The method can further include providing a reference signal to a second fiber optic cable configured to run parallel to the first fiber optic cable through the at least one zone, and receiving a reference response from the second fiber cable based on the reference signal, wherein determining, using the controller, the physical characteristic of the at least one zone can include determining the physical characteristic based upon the reference response, the optical response, and coherent optical frequency domain reflectometry (COFDR).

The first and second fiber optic cables can include fiber Bragg gratings.

Emitting, by the optical transmitter, the optical signal can include emitting the optical signal as a single laser pulse at a fixed wavelength, and determining, using the controller, the physical characteristic of the at least one zone can include determining the physical characteristic of the at least one zone using optical time domain reflectometry (OTDR).

Emitting, by the optical transmitter, the optical signal can include emitting the optical signal to a first end of the first fiber optic cable, and receiving, by the optical receiver, the response signal can include receiving the optical response from a second end of the first fiber optic cable, and the method can further include providing, by a probe transmitter, a probe signal to the second end of the first fiber optic cable, and receiving, by a probe receiver, a probe response from the first end of the first fiber optic cable, wherein determining, using the controller, the physical characteristic of the at least one zone can include determining the physical characteristic of the at least one zone based on a frequency difference between the optical response and the probe response using Brillouin optical time domain analysis (BOTDA).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for an aircraft that includes a plurality of zones, the system comprising:
    a first zone fiber optic cable routed through a first set of the plurality of zones;
    a reference fiber optic cable routed through each of the first set of the plurality of zones parallel to the first zone fiber optic cable;
    a first local controller configured to provide a first optical signal to the first zone fiber optic cable and obtain a first response signal from the first zone fiber optic cable;
    wherein the first local controller is configured to provide a reference signal to the reference fiber optic cable and receive a reference response from the reference fiber cable;
    wherein the first local controller is further configured to determine at least one temperature for each of first set of the plurality of zones based on the first response signal and upon the reference response, the optical response, and coherent optical frequency domain reflectometry (COFDR), and provide an indication for first detected zones of the first set of the plurality of zones in which the at least one temperature is greater than a threshold value.

2. The system of claim 1, further comprising:
    a second zone fiber optic cable routed through a second set of the plurality of zones;
    a second local controller configured to provide a second optical signal to the second zone fiber optic cable and obtain a second response signal from the second zone fiber optic cable;
    wherein the second local controller is further configured to determine at least one temperature for each of the second set of the plurality of zones based on the second response signal and provide an indication for second detected zones of the second set of the plurality of zones in which the at least one temperature is greater than a threshold value.

3. The system of claim 2, further comprising:
    a main controller configured to communication with the first and second local controllers, wherein the first and second local controllers provide the indication for the first and second detected zones to the main controller.

4. The system of claim 1, wherein the first zone fiber optic cable includes fiber Bragg gratings, and wherein the first local controller is configured to control an optical transmitter to provide the optical signal as a tunable swept-wavelength laser and/or a broadband laser and is configured to determine the at least one temperature for each of the first set of the plurality of zones using time division multiplexing (TDM) and/or wavelength division multiplexing (WDM).

5. The system of claim 1, wherein the first zone fiber optic cable and the reference fiber optic cable include fiber Bragg gratings.

6. The system of claim 1, wherein the first local controller includes an optical transmitter that is configured to produce laser pulses with a constant amplitude, and wherein the first local controller implements Incoherent Optical Frequency Domain Reflectometry (IOFDR) with a step frequency or swept frequency methodology.

7. The system of claim 1, wherein the first local controller includes an optical transmitter configured to provide the first optical signal as a single laser pulse at a fixed wavelength, and wherein the first local controller is configured to determine the at least one temperature of each of the first set of the plurality of zones using optical time domain reflectometry (OTDR).

8. The system of claim 1, wherein the first local controller is configured to provide the first optical signal to a first end of the first zone fiber optic cable and the first local controller is configured to receive the first response signal from a second end of the first zone fiber optic cable, and wherein the first local controller is further configured to provide a probe signal to the second end of the first zone fiber optic cable and receive the probe signal from the first end of the first zone fiber optic cable, and wherein the first local controller is configured to determine the at least one temperature for each of the first set of the plurality of zones based on a frequency difference between the response signal and the probe response using Brillouin optical time domain analysis (BOTDA).

9. The system of claim 1, wherein the each of the first set of the plurality of zones is one of a bleed air duct, cross-over bleed air duct, wheel well, wing box, air conditioning system, anti-icing system or nitrogen generation system.

10. A method of detecting thermal conditions for an aircraft, the method comprising:
    emitting, by a first local controller, a first optical signal to a first zone fiber optic cable, wherein the first zone fiber optic cable is routed through each of a first plurality of zones of the aircraft;

receiving, by the first local controller, a response signal from the first zone fiber optic cable based upon the first optical signal;

wherein the first zone fiber optic cable includes fiber Bragg gratings, and wherein emitting, by the first local controller, the first optical signal comprises emitting the first optical signal using a broadband laser;

determining, using the first local controller, at least one temperature for each of the first plurality of zones based on the response signal;

wherein determining, using the first local controller, the at least one temperature of each of the first plurality of zones comprises determining the at least one temperature based on time division multiplexing (TDM);

indicating a first condition for a respective one of the first plurality of zones if the at least one temperature for the respective one of the first plurality of zones is greater than a threshold;

wherein emitting, by the first local controller, the first optical signal comprises emitting laser pulses having a constant amplitude using a step frequency methodology; and wherein determining, using the first local controller, the at least one temperature of each of the first plurality of zones comprises determining the at least one temperature based on optical frequency domain reflectometry (IOFDR).

11. The method of claim 10, further comprising:

emitting, by a second local controller, a second optical signal to a second zone fiber optic cable, wherein the second zone fiber optic cable is routed through each of a second plurality of zones of the aircraft;

receiving, by the second local controller, a response signal from the second zone fiber optic cable based upon the second optical signal;

determining, using the second local controller, at least one temperature each of the second plurality of zones based on the response signal; and indicating a second condition for a respective one of the second plurality of zones if the at least one temperature for the respective one of the second plurality of zones is greater than a threshold.

12. The method of claim 11, wherein indicating the first condition comprises indicating the first condition to an avionics controller of the aircraft, and wherein indicating the second condition comprises indicating the second condition to the avionics controller.

13. The method of claim 10, wherein the first zone fiber optic cable includes fiber Bragg gratings, and wherein emitting, by the first local controller, the first optical signal comprises emitting the first optical signal using a tunable, swept-wavelength laser; and wherein determining, using the first local controller, the at least one temperature of each of the plurality of zones comprises determining the at least one temperature based on wavelength division multiplexing (WDM).

14. The method of claim 10, wherein emitting, by the first local controller, the first optical signal comprises emitting laser pulses having a constant amplitude using a swept frequency methodology; and wherein determining, using the first local controller, the at least one temperature of each of the first plurality of zones comprises determining the at least one temperature based on optical frequency domain reflectometry (IOFDR).

15. The method of claim 10, further comprising:

providing a reference signal to a second fiber optic cable configured to run parallel to the first zone fiber optic cable through each of the first plurality of zones; and receiving a reference response from the second fiber cable based on the reference signal;

wherein determining, using the first local controller, the at least one temperature of each of the first plurality of zones comprises determining the at least one temperature based upon the reference response, the first optical response, and coherent optical frequency domain reflectometry (COFDR).

16. The method of claim 10, wherein emitting, by the first local controller, the first optical signal comprises emitting the first optical signal to a first end of the first zone fiber optic cable, and wherein receiving, by the first local controller, the response signal comprises receiving the first optical response from a second end of the first zone fiber optic cable, and wherein the method further comprises:

providing a probe signal to the second end of the first zone fiber optic cable; and receiving a probe response from the first end of the first zone fiber optic cable;

wherein determining, using the first local controller, the at least one temperature of each of the first plurality of zones comprises determining the at least one temperature based on a frequency difference between the first optical response and the probe response using Brillouin optical time domain analysis (BOTDA).

\* \* \* \* \*